United States Patent
Yamasaki et al.

(10) Patent No.: US 12,434,685 B2
(45) Date of Patent: Oct. 7, 2025

(54) CONTROL SYSTEM FOR HYBRID VEHICLE

(71) Applicant: Mazda Motor Corporation, Hiroshima (JP)

(72) Inventors: Atsushi Yamasaki, Aki-gun (JP); Chikako Tsumura, Aki-gun (JP); Tomokuni Kusunoki, Aki-gun (JP); Yuichiro Yamane, Aki-gun (JP); Kanta Kono, Aki-gun (JP); Naoki Tsukamoto, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 290 days.

(21) Appl. No.: 18/190,773

(22) Filed: Mar. 27, 2023

(65) Prior Publication Data
US 2023/0406284 A1 Dec. 21, 2023

(30) Foreign Application Priority Data
Jun. 21, 2022 (JP) .................................. 2022-099650

(51) Int. Cl.
*B60W 20/15* (2016.01)
*B60W 10/02* (2006.01)
(Continued)

(52) U.S. Cl.
CPC ............ *B60W 20/15* (2016.01); *B60W 10/02* (2013.01); *B60W 10/06* (2013.01); *B60W 10/08* (2013.01);
(Continued)

(58) Field of Classification Search
CPC .......... B60W 10/188; B60W 2510/20; B60W 2510/0638; B60W 2510/081;
(Continued)

(56) References Cited

U.S. PATENT DOCUMENTS

2006/0243501 A1* 11/2006 Hidaka ................. B60W 10/02
 180/65.1
2014/0172216 A1* 6/2014 Seto ...................... B60W 20/13
 701/22
(Continued)

FOREIGN PATENT DOCUMENTS

JP 2012091551 A 5/2012

OTHER PUBLICATIONS

Virginia Tire & Auto, "What is Engine Braking & Why Should You Use It?," 2021. (Year: 2021).*

*Primary Examiner* — Aniss Chad
*Assistant Examiner* — Stephanie T Su
(74) *Attorney, Agent, or Firm* — Alleman Hall & Tuttle LLP

(57) ABSTRACT

To inhibit clutch engagement during an engine restart from affecting cooperative regenerative braking control and switching of braking in a hybrid vehicle having a P2 module onboard, a control system for the hybrid vehicle includes an engine, a motor, a K0 clutch, drive shafts, a hydraulic friction brake system, and a controller capable of performing cooperative regenerative braking control. When start of the engine is requested during the cooperative regenerative braking control, the controller performs a first process of transitioning to braking only by the frictional brake system, a second process of raising an engine revolution speed while engagement of the K0 clutch is initiated after completion of transitioning to the braking, and a third process of controlling the engine to resume operating at a timing after the engine revolution speed increases to match a motor revolution speed after the engagement of the K0 clutch is initiated.

5 Claims, 8 Drawing Sheets

(51) Int. Cl.
 *B60W 10/06* (2006.01)
 *B60W 10/08* (2006.01)
 *B60W 10/188* (2012.01)
 *B60W 30/18* (2012.01)

(52) U.S. Cl.
 CPC .... *B60W 10/188* (2013.01); *B60W 30/18127*
  (2013.01); *B60W 2510/20* (2013.01); *B60W*
    *2510/30* (2013.01); *B60W 2710/0644*
         (2013.01)

(58) Field of Classification Search
 CPC .. B60W 2540/12; B60W 10/18; B60W 10/20; Y02T 10/62
 See application file for complete search history.

(56) References Cited

U.S. PATENT DOCUMENTS

| | | | | |
|---|---|---|---|---|
| 2016/0229403 | A1* | 8/2016 | Khafagy | F02N 11/0866 |
| 2018/0112612 | A1* | 4/2018 | Tsunoda | F02D 41/0002 |
| 2018/0244258 | A1* | 8/2018 | Mouri | B60W 10/107 |
| 2021/0237584 | A1* | 8/2021 | Tabata | B60L 7/26 |
| 2021/0388787 | A1* | 12/2021 | Lee | F02D 41/068 |

* cited by examiner

FIG. 2

| | CL1 | CL2 | CL3 | BR1 | BR2 |
|---|---|---|---|---|---|
| FIRST GEAR | ○ | | | ○ | ○ |
| SECOND GEAR | | ○ | | ○ | ○ |
| THIRD GEAR | ○ | ○ | | | ○ |
| FOURTH GEAR | | ○ | ○ | | ○ |
| FIFTH GEAR | ○ | | ○ | | |
| SIXTH GEAR | ○ | ○ | ○ | | |
| SEVENTH GEAR | ○ | | ○ | ○ | |
| EIGHTH GEAR | | ○ | ○ | ○ | |
| REVERSE GEAR | | | ○ | ○ | ○ |

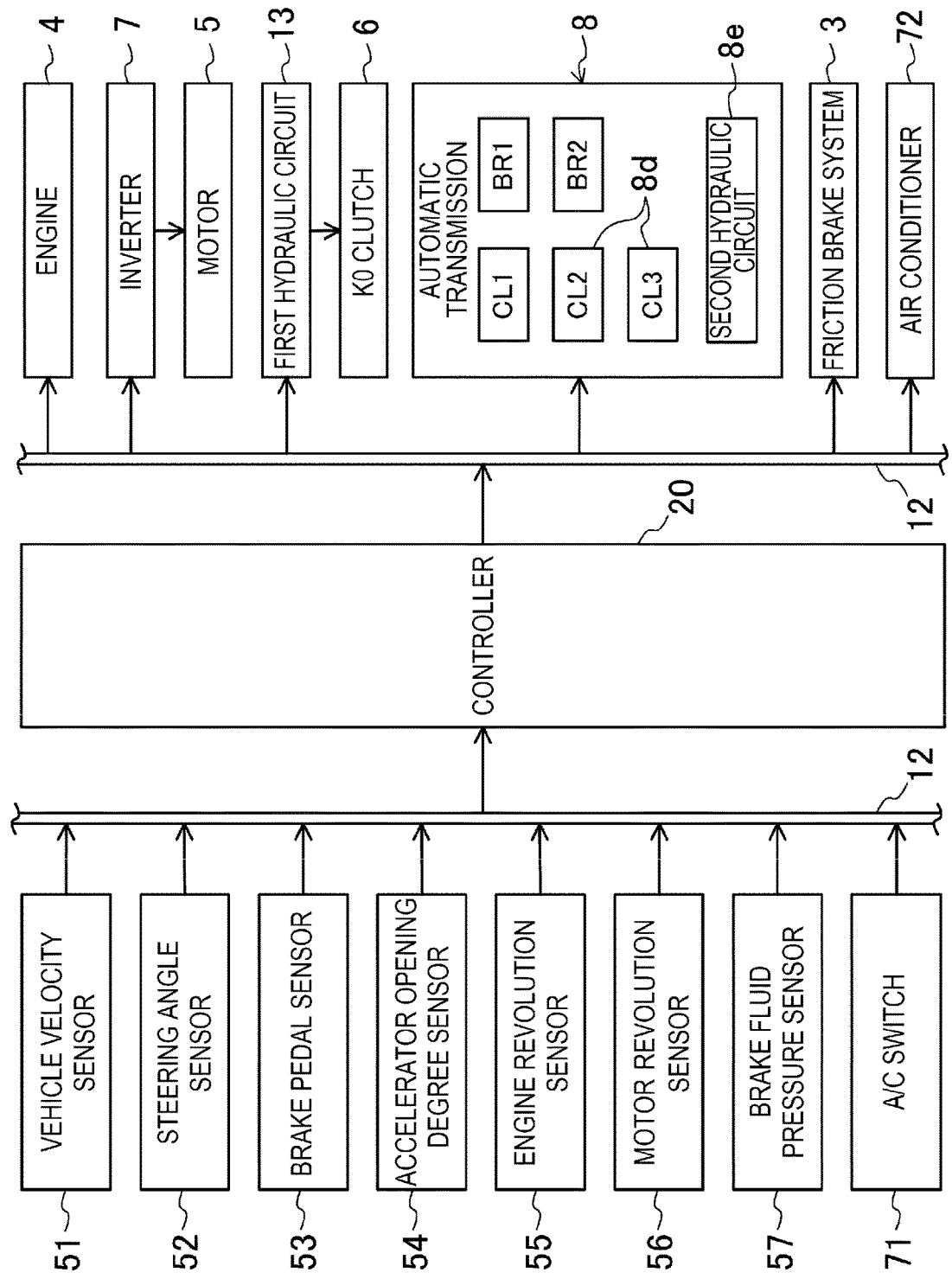

CONTROL SYSTEM FOR HYBRID VEHICLE

TECHNICAL FIELD

The present disclosure relates to a control system for a hybrid vehicle.

BACKGROUND ART

For example, JP2012-091551A discloses a control system for a hybrid vehicle. This hybrid vehicle is a vehicle having a so-called P2 module onboard.

Specifically, the hybrid vehicle disclosed in JP2012-091551A includes an engine, a first friction clutch element, a motor generator engaged with the engine via the first friction clutch element, a second friction clutch element provided between the motor generator and driving wheels, and a cooperative regenerative braking control execution unit.

The cooperative regenerative braking control execution unit disclosed in JP2012-091551A prohibits a regenerative torque from increasing until predetermined time passes since engaging the friction clutch element when a mechanical brake is operated and the friction clutch element is in a state of slipping (e.g., at a time of start of the engine). According to JP2012-091551A, the prohibition of the increase of the regenerative torque enables the prevention of occurrence of a shock caused by unintended slippage.

SUMMARY OF THE INVENTION

Problem to be Solved by the Invention

Meanwhile, for the hybrid vehicle having the P2 module onboard as disclosed in JP2012-091551A, the cooperative regenerative braking control is normally performed in a state of releasing a clutch provided between the engine and the motor during the operation of the brake pedal. This cooperative regenerative braking control is to brake the driving wheels by cooperation between an application of a braking force from a brake system and a regenerative operation by the motor.

Subsequently, when the vehicle enters a curve, it is often requested to restart the engine despite operating the brake pedal (that is, during the cooperative regenerative braking control), such as when an air conditioner is actuated during deceleration.

In this case, it is considered to switch from braking by the cooperative regenerative braking control to braking using only the brake system and couple the engine to the motor by engaging the clutch for increasing an output revolution speed of the engine.

However, when a hydraulic brake system is used, the switching of the braking cannot be performed instantaneously. Furthermore, it takes some time to couple the engine to the motor since the engagement of the clutch until the output revolution speed of the engine matches that of the motor.

Therefore, if the switching of the braking and the clutch engagement are initiated nearly simultaneously, then the two processes proceed nearly simultaneously. In this case, a situation of adjusting the output revolution speeds, such as a change in the regenerative operation of the motor when the output revolution speed of the engine does not have a smooth transition, may affect the cooperative regenerative braking control and the switching of the braking from the cooperative regenerative braking control.

For example, when the increase of the output revolution speed of the engine is delayed, it is required to cause the motor in the regenerative operation to perform a powering operation and to weaken a regenerative force (regenerative braking torque) by the motor. These types of processing inconveniently complicate the cooperative regenerative braking control.

The present disclosure has been made in light of these problems and an object of the present disclosure is to inhibit clutch engagement at the time of restart of an engine from affecting cooperative regenerative braking control and switching of braking in a hybrid vehicle having a P2 module onboard.

Means for Solving the Problem

The present disclosure relates to a control system for a hybrid vehicle including an engine that generates a vehicle travel driving force of the hybrid vehicle, a motor capable of performing a powering operation and a regenerative operation, a first clutch provided between the engine and the motor and that is switched between an engaged state of mutual engagement between the engine and the motor and a disengaged state of releasing the engagement, and an axle provided between the motor and driving wheels of the vehicle. This control system includes a hydraulic frictional brake system that distributes a braking force to the driving wheels in response to driver's operating a brake pedal and a control unit capable of performing cooperative regenerative braking control for braking the hybrid vehicle by cooperation between distribution of the braking force by the frictional brake system and application of a regenerative braking torque to the driving wheels by controlling the motor to perform the regenerative operation in a state of disengaging the first clutch during deceleration of the vehicle when operating the brake pedal.

Furthermore, according to one aspect of the present disclosure, when start of the engine is requested during the cooperative regenerative braking control, the control unit performs a first process of transitioning braking by the cooperative regenerative braking control to braking only by the frictional brake system, a second process of raising an output revolution speed of the engine by controlling the motor to perform either the powering operation or the regenerative operation while initiating engagement of the first clutch after completion of transitioning to the braking only by the frictional brake system, and a third process of controlling the engine to resume operating at timing after the output revolution speed of the engine increases to match an output revolution speed of the motor after the engagement of the first clutch is initiated.

According to these configurations, the hybrid vehicle is a hybrid vehicle having a so-called P2 module onboard in which the engine, the first clutch, the motor, a second clutch, the axle, and the driving wheels are coupled to transmit the travel driving force in this order.

Furthermore, during deceleration of the hybrid vehicle in which the frictional brake system is distributing the braking force to the driving wheels, the motor performs the regenerative operation. This control is the cooperative regenerative braking control between the frictional brake system and the motor. The cooperative regenerative braking control increases regenerative energy accumulated in a battery or the like. The regenerative braking torque by the motor is applied to the driving wheels. The frictional brake system distributes the braking force to the driving wheels in consideration of the regenerative braking torque applied to the driving wheels. As a result, the braking acting on the hybrid vehicle is braking responsive to driver's operating the brake pedal.

Here, the control unit increases the output revolution speed of the engine after completion of transitioning from the braking by the cooperative regenerative braking control to the braking only by the frictional brake system when the start of the engine is requested during the cooperative regenerative braking control.

Therefore, when adjustment of the output revolution speed of the engine is initiated, switching of the braking is already completed. As a result, it is possible to inhibit the situation of adjusting the output revolution speeds from affecting the cooperative regenerative braking control and the switching of the braking from the cooperative regenerative braking control.

Moreover, according to one aspect of the present disclosure, the control system for the hybrid vehicle may include a second clutch provided between the motor and the axle and that is switched between the engaged state of mutual engagement between the motor and the axle and the disengaged state of releasing the engagement. The second clutch may be engaged when the cooperative regenerative braking control is performed, and the control unit may control the second clutch to slip when the output revolution speed of the motor decreases below a predetermined revolution speed after the engagement of the first clutch is initiated in the second process.

According to these configurations, the second clutch is made to slip when a predetermined condition is satisfied. Making the second clutch slip can reduce a rotational resistance of the motor. This, in turn, can inhibit a reduction in the output revolution speed of the motor.

Here, when the timing of slipping the second clutch is not associated with the timing of switching to the braking only by the frictional brake system as in conventionally known configurations (e.g., when two processes are initiated simultaneously), the second clutch may be made to slip while the switching of the braking is not completed yet.

In this case, the regenerative operation is performed in a state of suppressing power transmission between the motor and the driving wheels. As a result, the regenerative braking torque applied from the motor is insufficiently transmitted to the driving wheels, possibly causing a G-force drop.

On the other hand, with the configurations described above, the second clutch is made to slip after finishing the switching of the braking. As a result, slipping of the second clutch is initiated in a state in which the regenerative braking torque has been applied to the driving wheels (e.g., in a state of reducing the regenerative braking torque to nearly zero). This can inhibit the occurrence of the G-force drop.

Furthermore, according to one aspect of the present disclosure, the control unit may control the second clutch to be released or slipped and control the engine to increase the output revolution speed of the engine to be equal to or higher than a predetermined idle revolution speed when the output revolution speeds of the engine and the motor decrease below the idle revolution speed after the output revolution speed of the engine is made to match the output revolution speed of the motor in the third process.

According to these configurations, the output revolution speeds of the engine and the motor can be kept equal to or higher than the idle revolution speed after the engine restarts. This enables smooth acceleration of the hybrid vehicle when the hybrid vehicle is requested to accelerate such as when depression of the brake pedal is transitioned to depression of an accelerator pedal.

Moreover, according to one aspect of the present disclosure, the control unit may determine that the start of the engine is requested when a steering angle exceeds a predetermined value during the cooperative regenerative braking control.

According to these configurations, the control unit performs the first process, the second process, and the third process when a steering wheel is operated during deceleration when the brake pedal is depressed (that is, while the cooperative regenerative braking control is being performed). This enables a smooth restart of the engine without causing a problem such as the G-force drop when, for example, the hybrid vehicle enters a corner with the brake pedal depressed. This can realize a so-called slow-in fast-out cornering technique more smoothly than conventional hybrid vehicles. Operability of the hybrid vehicle can be thereby enhanced.

Furthermore, according to one aspect of the present disclosure, the control unit may determine that the start of the engine is requested when an air conditioner switch accepts an ON-operation during the cooperative regenerative braking control.

According to these configurations, the control unit performs the first process, the second process, and the third process when the air conditioner switch is operated during deceleration when the brake pedal is depressed (that is, while the cooperative regenerative braking control is being performed). This enables a smooth restart of the engine without causing a problem such as the G-force drop when, for example, an air conditioner is desired to be driven during the depression of the brake pedal. This can inhibit the occurrence of a shock when the engine restarts. Ride quality of the hybrid vehicle can be thereby enhanced.

Advantage of the Invention

As described so far, according to the present disclosure, it is possible to inhibit the clutch engagement during the engine restart from affecting the cooperative regenerative braking control and the switching of the braking in the hybrid vehicle with the P2 module onboard.

BRIEF DESCRIPTION OF THE DRAWINGS

FIG. 2 illustrates an automatic transmission engagement table.
FIG. 3A is a block diagram of a control system for the hybrid vehicle.

MODES FOR CARRYING OUT THE INVENTION

Embodiments of a control system for a hybrid vehicle will be described hereinafter. The following descriptions are given by way of example.

(Hybrid Vehicle)

Figure 1:
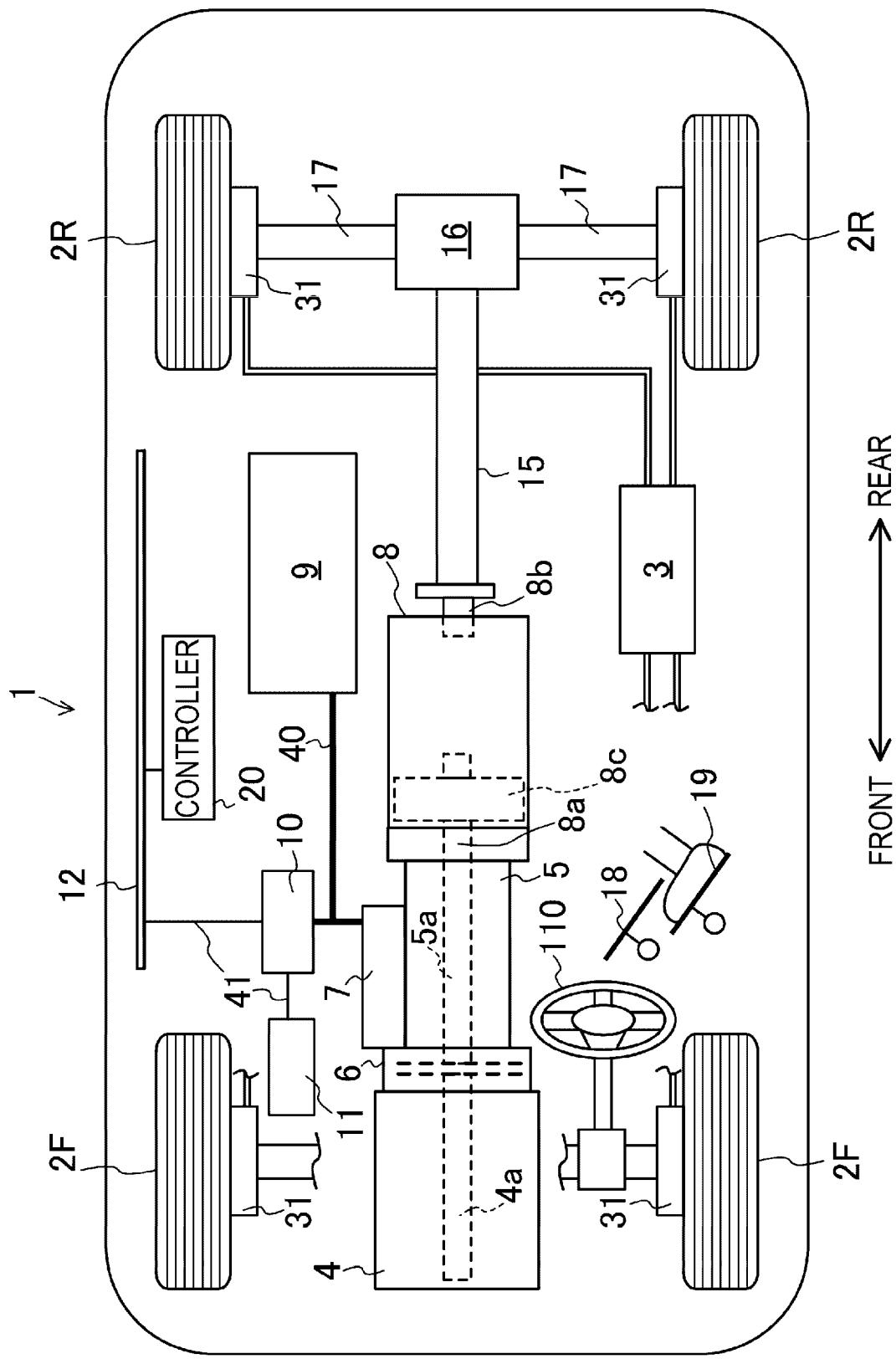
FIG. 1 illustrates a hybrid vehicle.

FIG. 1 illustrates a motor vehicle 1 (an example of a vehicle and a hybrid vehicle) to which the present disclosure is applied. This motor vehicle 1 is a hybrid vehicle capable of traveling using electricity. The motor vehicle 1 has front wheels 2F and rear wheels 2R, i.e., four wheels in total. A friction brake 31 is attached to each of the front wheels 2F and the rear wheels 2R for braking a rotation thereof.

As drive sources, an engine 4 generating a travel driving force of the motor vehicle 1 and a motor 5 are onboard the motor vehicle 1. These work together to drive the rear wheels 2R. The motor vehicle 1 thereby travels. The motor vehicle 1 is a rear-wheel drive vehicle. The motor 5 is used not only as the drive source but also as an electric generator during regeneration. That is, the motor 5 according to the present embodiment can perform a powering operation for generating the travel driving force of the motor vehicle 1 and a regenerative operation for supplying regenerative energy to a battery (a high-voltage battery 9 to be described later) when decelerating the motor vehicle 1.

This motor vehicle 1 has the high-voltage battery 9 at a rated voltage equal to or lower than 50V onboard, as described later. The electricity is supplied to the motor from the high-voltage battery 9, and the motor 5 functions to allow the motor vehicle 5 to travel mainly in the way of assisting the engine 4. The motor vehicle 1 is a so-called mild hybrid vehicle. It is noted that the motor vehicle 1 may be a so-called plug-in hybrid vehicle to which the electricity can be supplied from an external power supply.

Furthermore, the motor vehicle 1 is a hybrid vehicle having a so-called P2 module onboard so that the engine 4, a first clutch (K0 clutch 6), the motor 5, a second clutch (K1 clutch 8d), an axle (drive shafts 17), and driving wheels (rear wheels 2R) are coupled to transmit the travel driving force thereto in this order.

In the case of this motor vehicle 1, the engine 4 is disposed on a front side of a vehicle body, and the driving wheels are disposed on a rear side of the vehicle body. That is, this motor vehicle 1 is a so-called front-engine, rear-wheel drive (FR) vehicle.

As devices in a driving system, the K0 clutch 6, an inverter 7, and an automatic transmission 8, as well as the engine 4 and the motor 5, are onboard the motor vehicle 1. In addition, a controller 20 as a device in a control system is onboard the motor vehicle 1. Furthermore, a hydraulic friction brake system 3 including friction brakes 31 is onboard the motor vehicle 1 as a device in a braking system.

(Devices in Driving System)

The engine 4 is, for example, an internal combustion engine that burns a fossil fuel. The engine 4 is also a so-called four-cycle engine in which rotational power is generated by repeating cycles of intake, compression, expansion, and exhaust. While being configured as a diesel engine classified into a compression-ignition engine, the engine 4 may be of various types in various forms, such as a spark-ignition engine and other compression-ignition engines. The engine 4 operates by injecting a fuel such as fossil fuel and burning the fuel in cylinders.

In this motor vehicle 1, a crankshaft 4a that outputs rotational power is disposed in a nearly central portion in a vehicle width direction of the engine 4 in a state of being oriented to a front-rear direction of the vehicle body. Various devices and mechanisms associated with the engine 4, such as an intake system, an exhaust system, and a fuel supply system, are installed in the motor vehicle 1.

The motor 5 is a permanent magnet-type synchronous motor driven by a three-phase alternating-current. The motor 5 is disposed in the rear of the engine 4 in series via the K0 clutch 6. The motor 5 is also disposed in front of the automatic transmission 8 in series.

The K0 clutch 6 is provided between the engine 4 and the motor 5. More specifically, the K0 clutch 6 is installed to be provided between a front end portion of a shaft 5a of the motor 5 and the crankshaft 4a of the engine 4. The K0 clutch 6 is switched between a state (engaged state) in which the crankshaft 4a is coupled to the shaft 5a and a state (disengaged state) in which the crankshaft 4a is separate from the shaft 5a.

The engaged state of the K0 clutch 6 is a state in which the engine 4 is engaged with the motor 5 are engaged. The disengaged state of the K0 clutch 6 is a state in which the engagement between the engine 4 and the motor 5 is released. The K0 clutch 6 is an example of a "first clutch" in the present embodiment. The switching of the K0 clutch 6, which serves as the first clutch, between the engaged state and the disengaged state is performed under hydraulic control of a first hydraulic circuit 13 (illustrated only in FIG. 3A).

A rear end portion of the shaft 5a of the motor 5 is coupled to an input shaft 8a of the automatic transmission 8. Therefore, the engine 4 is coupled to the automatic transmission 8 via the K0 clutch 6 and the shaft 5a. Setting the K0 clutch 6 into the disengaged state causes the engine 4 to be disengaged from the automatic transmission 8.

While the motor vehicle 1 is traveling, the K0 clutch 6 is switched between the engaged state and the disengaged state. For example, when the motor vehicle 1 decelerates, the K0 clutch 6 is switched to the disengaged state to often perform regeneration in a state of disengaging the engine 4. For example, in cooperative regenerative braking control to be described later, the motor 5 can perform a regenerative operation in a state of disengaging the K0 clutch 6 serving as the first clutch. In addition, the K1 clutch 8d serving as a second clutch is designed to be engaged when the cooperative regenerative braking control is performed.

The motor 5 is connected to the high-voltage battery 9 onboard as a driving power supply via the inverter 7 and a high-voltage cable 40. In the case of this motor vehicle 1, the high-voltage battery 9 is a direct-current battery at a rated voltage equal to or lower than 50V, specifically, 48V.

The high-voltage battery 9 supplies a high-voltage direct current to the inverter 7. The inverter 7 converts the direct-current electric power into a three-phase alternating current to energize the motor 5. The motor 5 is thereby driven to rotate. Furthermore, the motor 5 supplies regenerative energy to the high-voltage battery 9.

The high-voltage battery 9 is also connected to a DC-DC converter 10 via the high-voltage cable 40. The DC-DC converter 10 converts high-voltage direct-current electric power of 48V into low-voltage direct-current electric power of 12V and outputs the low-voltage direct-current electric power of 12V. The DC-DC converter 10 (specifically, an output side thereof) is connected to a low-voltage battery 11 (so-called lead storage battery) via a low-voltage cable 41.

The low-voltage battery 11 is connected to various electric components via the low-voltage cable 41. The DC-DC converter 10 is also connected to a CAN (Controller Area Network) 12 via the low-voltage cable 41. The DC-DC converter 10 thereby supplies low-voltage direct-current electric power to the CAN 12.

The automatic transmission 8 is a hydraulically controlled, multi-stage automatic transmission (so-called AT). This automatic transmission 8 has the input shaft 8a connected to the engine 4 and an output shaft 8b connected to the driving wheels (rear wheels 2R) of the motor vehicle 1. This automatic transmission 8 can shift a rotation input to the input shaft 8a at a gear ratio corresponding to a gear position selected by an occupant and output the rotation.

Specifically, the input shaft 8a is disposed in a front end portion of the automatic transmission 8. As described above, this input shaft 8a is coupled with the shaft 5a of the motor 5. The output shaft 8b is disposed in a rear end portion of the automatic transmission 8. This output shaft 8b rotates in a state of being independent of the input shaft 8a.

A transmission mechanism including a torque converter 8c, a plurality of planetary gear mechanisms, a plurality of friction clutch elements, and the like is incorporated between the input shaft 8a and the output shaft 8b. Each friction clutch element is hydraulically switched between the engaged state and the disengaged state.

FIG. 2 illustrates an engagement table of this automatic transmission 8. In the table, circles indicate engagement. As the friction clutch elements, three clutches including a first clutch CL1, a second clutch CL2, and a third clutch CL3 and two brakes including a first brake BR1 and a second brake BR2 are incorporated into this automatic transmission 8. The automatic transmission 8 also has a second hydraulic circuit 8e (illustrated only in FIG. 3A) for switching these friction clutch elements between the engaged state and the disengaged state.

The automatic transmission 8 selects and engages three elements from among the three clutches and the two brakes under the hydraulic control of the second hydraulic circuit 8e. The gear position of the automatic transmission 8 is thereby switched to any gear position from a first gear to an eighth gear for forward driving and a reverse gear position (reverse speed) for backward driving.

Specifically, the first clutch CL1, the first brake BR1, and the second brake BR2 are engaged to form the first gear. The second clutch CL2, the first brake BR1, and the second brake BR2 are engaged to form the second gear. The first clutch CL1, the second clutch CL2, and the second brake BR2 are engaged to form the third gear. The second clutch CL2, the third clutch CL3, and the second brake BR2 are engaged to form the fourth gear. The first clutch CL1, the third clutch CL3, and the second brake BR2 are engaged to form the fifth gear. The first clutch CL1, the second clutch CL2, and the third clutch CL3 are engaged to form the sixth gear. The first clutch CL1, the third clutch CL3, and the first brake BR1 are engaged to form the seventh gear. The second clutch CL2, the third clutch CL3, and the first brake BR1 are engaged to form the eighth gear. The third clutch CL3, the first brake BR1, and the second brake BR2 are engaged to form the reverse gear.

Then, when upshifting from, for example, the first gear, the second clutch CL2 is engaged as an alternative to the first clutch CL1 to switch the gear position from the first gear to the second gear. The first clutch CL1 is engaged as an alternative to the first brake BR1 to switch the gear position from the second gear to the third gear. The third clutch CL3 is engaged as an alternative to the first clutch CL1 to switch the gear position from the third gear to the fourth gear.

Upshifting to the fifth and higher gears is performed similarly to the above. Downshifting is performed in opposite procedures to those in the switching for upshifting.

When the elements to be engaged are not engaged in each gear position, the input shaft 8a and the output shaft 8b are in a separated state (so-called neutral). Even when the rotational power is input to the automatic transmission 8 from the drive source, the rotational power is not output from the automatic transmission 8.

In the present embodiment, the automatic transmission 8 may be put into neutral by releasing the second clutch CL2 or the third clutch CL3 during the deceleration of the motor vehicle 1. Specifically, when the automatic transmission 8 is in a state of the second gear, third gear, or fourth gear, the automatic transmission 8 is put into neutral by releasing the second clutch CL2. In addition, when the automatic transmission 8 is in a state of the fifth gear, sixth gear, seventh gear, or eighth gear, the automatic transmission 8 is put into neutral by releasing the third clutch CL3.

In the following descriptions, the second clutch CL2 and the third clutch CL3 are often referred to as the K1 clutch 8d collectively (refer to FIG. 3A). Releasing the K1 clutch 8d during the deceleration of the motor vehicle 1 means that power transmission between the input shaft 8a and the output shaft 8b of the automatic transmission 8 is interrupted to put the automatic transmission 8 into neutral.

As illustrated in FIG. 1, the output shaft 8b of the automatic transmission 8 is coupled to a differential gear 16 via a propeller shaft 15 extending in the front-rear direction of the vehicle body. A pair of drive shafts 17, 17 extending in the vehicle width direction and coupled to the left and right rear wheels 2R, 2R are coupled to the differential gear 16. The rotational power output through the propeller shaft 15 is sorted out by the differential gear 16 and transmitted to the rear wheels 2R through the pair of drive shafts 17, 17. The pair of drive shafts 17, 17 is an example of an "axle" provided between the motor 5 and the driving wheels (left and right rear wheels 2R, 2R) in the present disclosure.

While the motor vehicle 1 is traveling, the K1 clutch 8d is switched between the engaged state and the disengaged state. Here, the engaged state of the K1 clutch 8d is a state in which the motor 5 is engaged with the pair of drive shafts 17, 17 serving as the axle coupled to the driving wheels. The disengaged state of the K1 clutch 8d is a state in which the engagement between the motor 5 and the pair of drive shafts 17, 17 is released.

The K1 clutch 8d is an example of a "second clutch" in the present embodiment. The switching between the engaged state and the disengaged state of the K1 clutch 8d serving as the second clutch is performed under the hydraulic control of the second hydraulic circuit 8e, as described above.

(Control System for Hybrid Vehicle)

FIG. 3A is a block diagram of a control system for the hybrid vehicle. In the motor vehicle 1, the controller 20 described above is installed for controlling the engine 4, the motor 5, the K0 clutch 6, the automatic transmission 8, the friction brake system 3, and the like in response to a driver's operation and controlling the motor vehicle 1 to travel.

The controller 20 is configured with hardware such as a processor, memory, and an interface and software such as a database and a control program. It is noted that while one controller 20 is illustrated in the control system of FIG. 3A, the controller of the control system may be divided into a unit (powertrain control module (PCM)) mainly controlling actuation of the drive sources (the engine 4 and the motor 5) and a unit (transmission control module (TCM)) mainly controlling actuation of the K0 clutch 6 and the automatic transmission 8. The PCM and the TCM are connected by the CAN 12 and configured to be capable of electrically communicating with each other. The PCM also functions as a brake electronic control unit (ECU) for controlling the friction brake system 3. It is noted that the brake ECU may be separated from the PCM. The controller 20 is an example of a "control unit" in the present embodiment.

The control system for the hybrid vehicle includes sensors that measure various parameters related to the traveling of the vehicle and a switch detecting a driver's operation. Specifically, the control system, i.e., transmission control system includes a vehicle velocity sensor 51, a steering angle sensor 52, a brake pedal sensor 53, an accelerator opening degree sensor 54, an engine revolution sensor 55, a motor revolution sensor 56, and an A/C switch 71.

The vehicle velocity sensor 51 outputs a signal corresponding to a vehicle velocity of the motor vehicle 1. The steering angle sensor 52 outputs a signal corresponding to a rotational angle, that is, a steering angle of a steering wheel 110 (refer to FIG. 1) operated by a driver.

The brake pedal sensor 53 outputs a signal corresponding to depression of a brake pedal 19 (refer to FIG. 1) operated by the driver. The accelerator opening degree sensor 54 outputs a signal corresponding to depression of an accelerator pedal 18 (refer to FIG. 1) operated by the driver.

The engine revolution sensor 55 outputs a signal corresponding to the output revolution speed of the engine 4 (engine revolution speed), that is, corresponding to a revolution speed of the crankshaft 4a. The motor revolution sensor 56 outputs a signal corresponding to the output revolution speed of the motor 5 (motor revolution speed), i.e., corresponding to a revolution speed of the shaft 5a of the motor 5 and a revolution speed of the input shaft 8a of the automatic transmission 8.

The A/C switch 71 is a switch for switching an air conditioner 72 illustrated only in FIG. 3A between an ON-state and an OFF-state. When being operated to be turned on to set the air conditioner 72 into the ON-state by the driver, the A/C switch 71 outputs a signal corresponding to the ON operation.

The controller 20 receives the signals output from the sensors and the switch via the CAN 12. The controller 20 outputs control signals to the engine 4, the inverter 7, the first hydraulic circuit 13, the second hydraulic circuit 8e, the air conditioner 72, and the friction brake system 3 through the CAN 12. The controller 20 thereby controls the engine 4, the motor 5, the K0 clutch 6, the automatic transmission 8, the air conditioner 72, and the friction brake system 3.

For example, when the driver performs the ON-operation on the A/C switch 71 to turn on the air conditioner 72, the controller 20 actuates a compressor of the air conditioner 72 using a driving force of the engine 4.

Figure 3B:
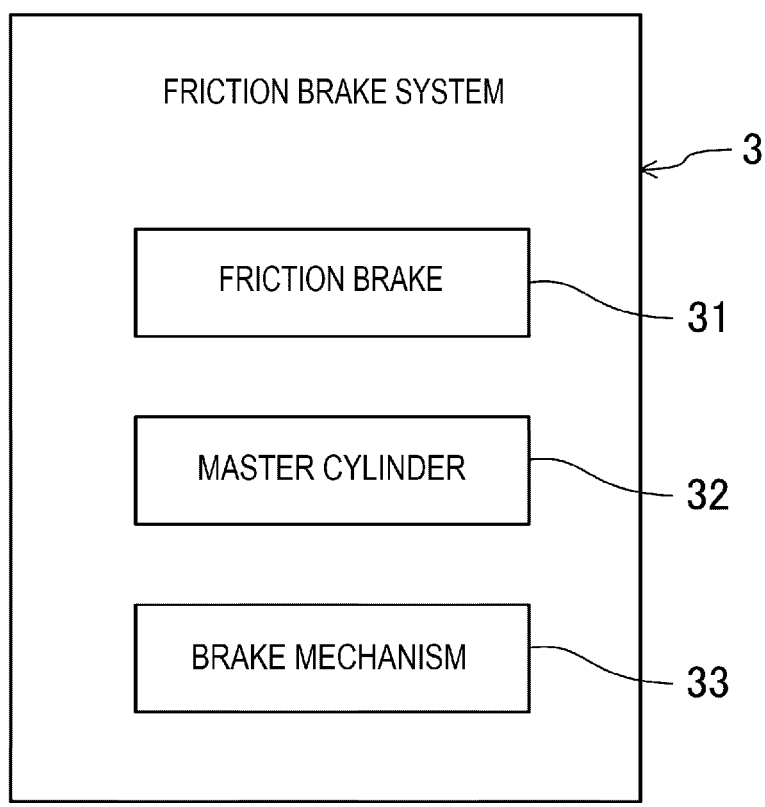
FIG. 3B is a block diagram of a friction brake system.

Furthermore, the controller 20 controls the friction brake system 3 for controlling the motor vehicle 1. FIG. 3B is a block diagram of the friction brake system 3. The friction brake system 3 illustrated in FIG. 3B distributes the braking force to the front wheels 2F and the rear wheels 2R of the motor vehicle 1 in response to the operation of the brake pedal 19 so that braking can be realized when the driver operates the brake pedal 19. This friction brake system 3 is a hydraulically controlled friction brake system.

As illustrated in FIG. 3B, the friction brake system 3 includes the four friction brakes 31 described above (only one of which is illustrated in FIG. 3B), a master cylinder 32, and a brake mechanism 33.

The master cylinder 32 transmits a pedal force acting on the brake pedal 19 to brake fluid and converts the pedal force into a hydraulic pressure of the brake fluid. The brake mechanism 33 switches a hydraulic circuit in response to an electric signal from the controller 20 to be described later.

Then, the brake mechanism 33 switches the hydraulic circuits, controlling hydraulic pressure acting on the front and rear friction brakes 31. The high and low of the hydraulic pressure correspond to that of the braking force distributed by each friction brake 31. That is, when the hydraulic pressure is low, the braking force is low, compared with when the hydraulic pressure is high.

To determine whether the hydraulic pressure is high or low in the friction brake system 3, a brake fluid pressure sensor 57 (illustrated only in FIG. 3A) is electrically connected to the controller 20 according to the present embodiment. This brake fluid pressure sensor 57 detects a fluid pressure in the friction brake system 3 and inputs signals indicating a detection results to the controller 20.

Then the controller 20 according to the present embodiment performs cooperative regenerative braking control (first regenerative braking control) that the regenerative braking torque of the motor 5 handles a part of a driver's requested braking force during the vehicle deceleration when the brake pedal 19 is operated. In this case, the fluid pressure of each friction brake 31 is reduced by an amount of the regenerative braking torque of the motor 5.

This cooperative regenerative braking control is configured to brake the hybrid vehicle 1 by a cooperation between the distribution of the braking force by the friction brake system 3 and the regenerative operation by the motor 5 (more specifically, the application of the regenerative braking torque to the rear wheels 2R by causing the motor 5 to perform the regenerative operation).

The cooperative regenerative braking control can be performed in a state of disengaging the K0 clutch 6. Performing the cooperative regenerative braking control in the state of disengaging the K0 clutch 6 enables the motor 5 to perform the regenerative operation without disturbance of engine braking. This can ensure more electricity generated by the motor 5.

Furthermore, the controller 20 according to the present embodiment can perform a restart control configured from a plurality of processes when the engine 4 is requested to restart during the cooperative regenerative braking control. General processes, including the processes associated with this restart control, performed by the controller 20 will be described hereinafter.

(General Processes)

Figure 4:
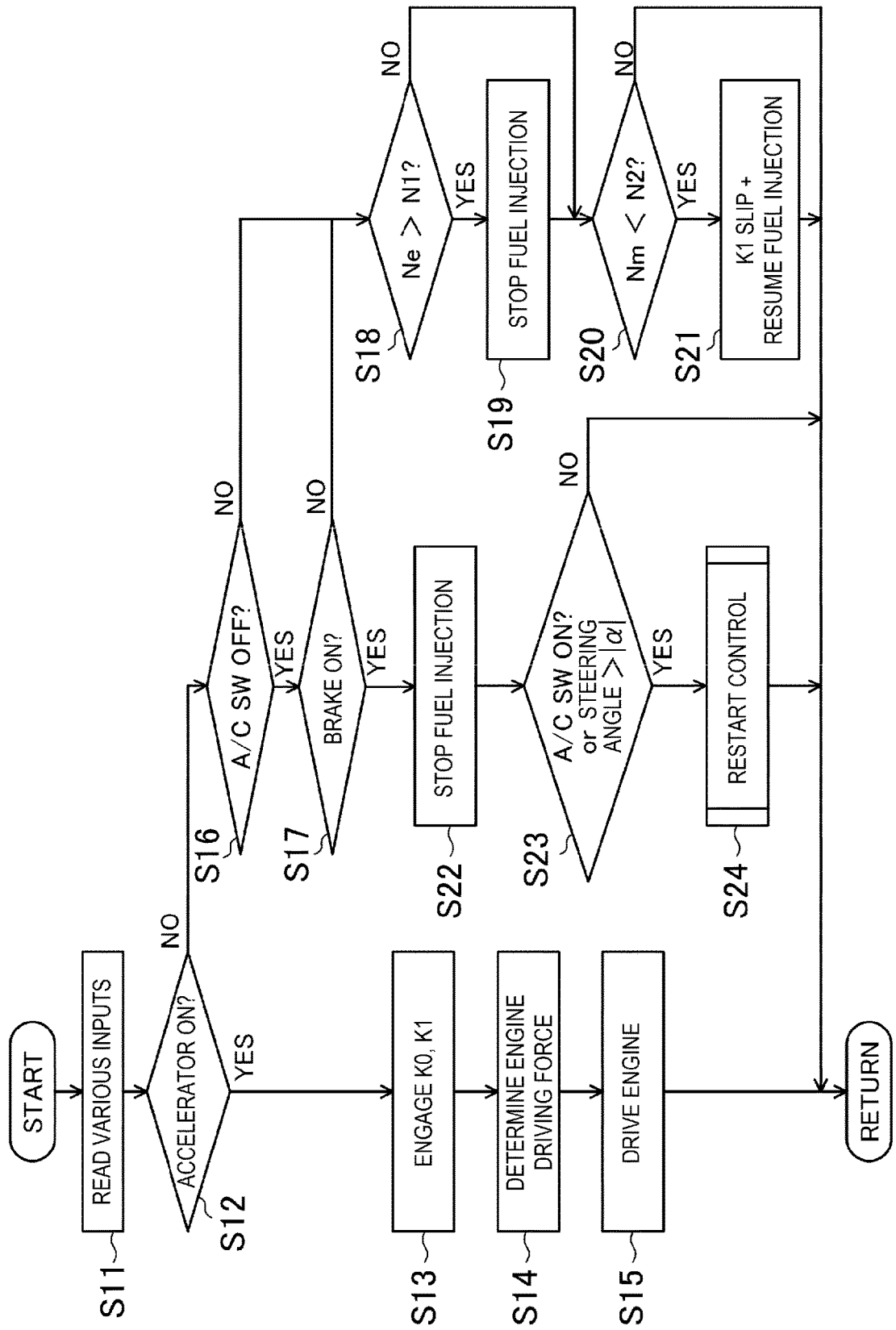
FIG. 4 is a flowchart illustrating processes related to an engine.
Figure 5:
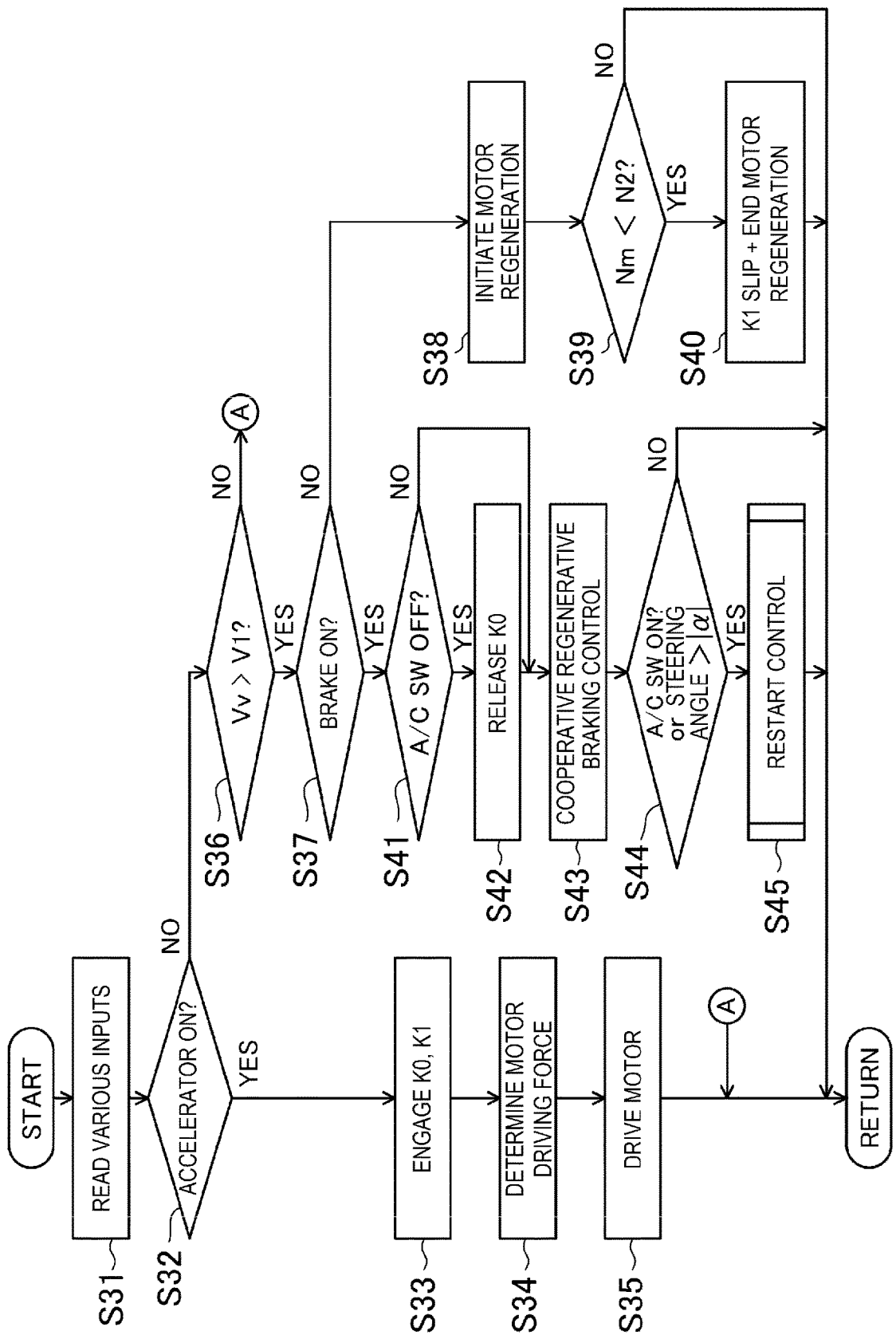
FIG. 5 is a flowchart illustrating processes related to a motor and brakes.

FIG. 4 is a flowchart illustrating processes related to the engine 4. In addition, FIG. 5 is a flowchart illustrating processes related to the motor 5 and the brakes (friction brake system 3). The control process of FIG. 4 and the control process of FIG. 5 are not performed one at a time in sequential order but proceed nearly simultaneously.

First, in Step S11 of FIG. 4, the controller 20 reads inputs from the various sensors and the switch. In subsequent Step S12, the controller 20 determines whether the driver is depressing the accelerator pedal 18. This determination is performed on the basis of the signal of the accelerator opening degree sensor 54.

When a determination result of Step S12 is Yes, that is, when the driver is depressing the accelerator pedal 18, the controller 20 causes the control process to go to Step S13. When the determination result of Step S12 is No, that is, when the driver is not depressing the accelerator pedal 18, the controller 20 causes the control process to go to Step S16.

It is noted that the content of Step S11 is identical to that of Step S31 of FIG. 5. A content of Step S12 is identical to that of Step S32 of FIG. 5. For the sake of convenience of description, Step S11 and Step S31, and Step S12 and Step S32 are illustrated in independent flowcharts. However, the steps are performed not as independent steps but as common processes to the engine 4, the motor 5, and the friction brake system 3.

For example, when a determination result of Step S32 is Yes, that is, when the driver is depressing the accelerator pedal 18, the controller 20 causes the control process to go to Step S33. When the determination result of Step S32 is No, that is, when the driver is not depressing the accelerator pedal 18, the controller 20 causes the control process to go to Step S36.

(Processes During Acceleration Request)

Steps S13 to S15 of FIG. 4 and Steps S31 to S33 of FIG. 5 are processes mainly performed during an acceleration request to the motor vehicle 1. That is, when moving to Step S13 and Step S33, the controller 20 determines to accelerate the motor vehicle 1 and performs a control corresponding to the determination.

Specifically, in Step S13 of FIG. 4, the controller 20 engages both the K0 clutch 6 and the K1 clutch 8d. The controller 20 performs this engagement by controlling the first hydraulic circuit 13 and the second hydraulic circuit 8e. It is noted that when both the K0 clutch 6 and the K1 clutch 8d are already engaged, the controller 20 maintains the engagement.

In Step S14, the controller 20 determines a driving force exerted on the engine 4 and the motor 5 entirely on the basis of a depression amount of the accelerator pedal 18, the vehicle velocity at a current moment, and the like. This determination is performed on the basis of the signal of the accelerator opening degree sensor 54, the signal of the vehicle velocity sensor 51, and the like. The controller 20 further determines a driving force to be exerted on the engine 4 on the basis of the driving force determined as described above.

Subsequently, in Step S15, the controller 20 determines a fuel injection amount and the like for realizing the driving force determined in Step S14 and controls the engine 4 on the basis of various parameters determined in that way.

On the other hand, the content of Step S33 in FIG. 5 is identical to that of Step S13 described above. For the sake of convenience of description, Step S33 and Step S13 are illustrated in the independent flowcharts. However, the steps are performed not as independent steps but as common processes to the engine 4, the motor 5, and the friction brake system 3.

Subsequently, in Step S34 following Step S33, the controller 20 determines the driving force exerted on the engine 4 and the motor 5 entirely on the basis of the depression amount of the accelerator pedal 18, the vehicle velocity at the current moment, and the like. This process is performed commonly to the process of Step S14 described above. The controller 20 further determines a driving force to be exerted on the motor 5 on the basis of the driving force determined as described above.

Subsequently, in Step S35, the controller 20 determines control parameters of the motor 5 for realizing the driving force determined in Step S34 and controls the motor 5 to perform the powering operation on the basis of the various parameters determined in that way.

(Processes During Non-Acceleration Request and During Non-Operation of Brake Pedal)

Steps S16 to S24 of FIG. 4 and Steps S36 to S45 of FIG. 5 are processes mainly performed during a non-acceleration request to the motor vehicle 1 (particularly during vehicle deceleration). When going to Step S16 and Step S36, the controller 20 performs a process in response to a situation of operating the brake pedal 19 and the like. Processes performed during the non-acceleration request when the brake pedal 19 is not depressed (when the brake pedal 19 is not operated) will be mainly described.

First, in the control processes associated with the engine 4 goes to Step S16 of FIG. 4 during the non-acceleration request when the accelerator pedal 18 is not depressed. In this Step S16, the controller 20 determines whether the air conditioner 72 is turned off. This determination is performed on the basis of the signal of the A/C switch 71.

When a determination result of Step S16 is Yes, that is, when the air conditioner 72 is turned off (when the air conditioner 72 is not driven), the controller 20 causes the control process to go to Step S17. When the determination result of Step S16 is No, that is, when the air conditioner 72 is turned on, the controller 20 goes to the control process in Step S18.

In Step S17 following Step S16, the controller 20 determines whether the drives is depressing the brake pedal 19. This determination is performed on the basis of the signal of the brake pedal sensor 53. When a determination result of Step S17 is Yes, that is, when the driver is depressing the brake pedal 19, the controller 20 causes the control process to go to Step S22. When the determination result of Step S17 is No, that is, when the driver is not depressing the brake pedal 19, the controller 20 causes the control process to go to Step S18.

When the controller 20 goes to Step S22, then fuel injection is stopped in the engine 4, and the cooperative regenerative braking control is performed in the motor 5 and the friction brake system 3 depending on the vehicle velocity. This control is performed in a state of releasing the K0 clutch 6, depending on a situation of operating the A/C switch 71.

On the other hand, when the controller 20 goes not to Step S22 but to Step S18, the motor vehicle 1 decelerates more slowly than when the brake pedal 19 is operated. In this case, the controller 20 performs a process considering inhibition of engine stalling or the like.

Specifically, in Step S18, the controller 20 determines whether the engine revolution speed (Ne) is higher than a predetermined first threshold (N1) (Ne>N1?). This determination is performed on the basis of the signal of the engine revolution sensor 55.

When a determination result of Step S18 is Yes, that is, when the engine revolution speed is higher than the first threshold, the controller 20 goes to the control process in Step S19. When going to Step S19, the controller 20 stops the fuel injection of the engine 4 and then causes the control process to go to Step S20.

On the other hand, when the determination result of Step S18 is No, that is, when the engine revolution speed is equal to or lower than the first threshold, the controller 20 causes the control process to skip Step S19 and to go to the control process in Step S20. In this case, the controller 20 controls the fuel injection of the engine 4 to continue. This can inhibit the engine stalling accompanying the deceleration.

In Step S20, the controller 20 determines whether the motor revolution speed (Nm) is lower than a predetermined second threshold (N2) (Nm<N2?). This determination is performed on the basis of the signal of the motor revolution sensor 56.

When a determination result of Step S20 is Yes, that is, when the motor revolution speed is lower than the second threshold, the controller 20 causes the control process to go to Step S21. When the controller 20 goes to Step S21 and the fuel injection is stopped in Step S19 described above, the controller 20 also resumes the fuel injection. As also illustrated in Step S40 of FIG. 5, the controller 20 controls the K1 clutch 8*d* to slip along with resuming the fuel injection. By controlling in this way, the engine stalling can be inhibited.

On the other hand, when the determination result of Step S20 is No, that is, when the motor revolution speed is equal to or higher than the second threshold, the controller 20 causes the control process to skip Step S21 and to return to the control processes.

On the other hand, the control processes associated with the motor 5 and the friction brake system 3 goes to Step S36 of FIG. 5 during the non-acceleration request. In this Step S36, the controller 20 determines whether the vehicle velocity (Vv) of the motor vehicle 1 is higher than a predetermined first velocity (V1) (Vv<V1?). This determination is performed on the basis of the signal of the vehicle velocity sensor 51.

When a determination result of Step S36 is No, that is, when the vehicle velocity is equal to or lower than the first velocity, the controller 20 causes the control process to go to a point after Step S35. In this case, the controller 20 causes the control process to return without performing special processes.

On the other hand, when the determination result of Step S36 is Yes, the controller 20 causes the control process to go to Step S37. In this Step S37, the controller 20 determines whether the driver is depressing the brake pedal 19. This determination is performed on the basis of the signal of the brake pedal sensor 53.

When a determination result of Step S37 is Yes, that is, when the driver is depressing the brake pedal 19, the controller 20 causes the control process to go to Step S41. When the determination result of Step S37 is No, that is, when the driver is not depressing the brake pedal 19, the controller 20 causes the control process to go to Step S38.

When the controller 20 goes to Step S41, the cooperative regenerative braking control is performed in the motor 5 and the friction brake system 3, and fuel injection is stopped in the engine 4 depending on the situation of operating the A/C switch 71. These pieces of control can be performed in the state of releasing the K0 clutch 6.

On the other hand, when the controller 20 goes not to Step S42 but to Step S38, the motor vehicle 1 decelerates more slowly than when the brake pedal 19 is operated. In this case, the controller 20 performs a process considering inhibition of engine stalling or the like.

Specifically, in Step S38 to which the controller 20 goes when the driver is not depressing the brake pedal 19, the controller 20 initiates a second regenerative braking control for performing regenerative braking corresponding to the engine braking.

This second regenerative braking control is the regenerative braking control performed during the deceleration of the motor vehicle 1 when the friction brake system 3 does not apply the braking force to the front wheels 2F and the rear wheels 2R, and is so-called "motor regeneration" for applying a regenerative braking torque to the rear wheels 2R by causing the motor 5 to perform the regenerative operation.

After initiating the second regenerative braking control in Step S38, the controller 20 monitors the motor revolution speed. In Step S39 following Step S38, the controller 20 determines whether the motor revolution speed (Nm) is lower than the predetermined second threshold (N2) (Nm<N2?). This determination is performed on the basis of the signal of the motor revolution sensor 56.

When a determination result of Step S39 is Yes, that is, when the motor revolution speed is lower than the second threshold, the controller 20 causes the control process to go to Step S40. When going to Step S40, the controller 20 controls the K1 clutch 8*d* to slip (K1 slip). In addition, the controller 20 ends the second regenerative braking control (motor regeneration) initiated in Step S38 described above. By controlling in this way, the engine stalling can be avoided.

On the other hand, when the determination result of Step S39 is No, that is, when the motor revolution speed is equal to or higher than the second threshold, the controller 20 causes the control process to skip Step S40 and to return.

(Processes During Non-Acceleration Request and During Operation of Brake Pedal)

During the non-acceleration request when the driver is depressing the brake pedal 19 (when the brake pedal 19 is operated), the controller 20 causes the control process to go to Step S22 of FIG. 4 and that in Step S41 of FIG. 5. Processes in these cases will be described hereinafter.

First, in Step S22 corresponding to the control process associated with the engine 4, the controller 20 stops the fuel injection of the engine 4. The engine revolution speed thereby reaches zero. In parallel to stopping the fuel injection, the controller 20 performs the cooperative regenerative braking control described above via the motor 5 and the friction brake system 3 in the state of releasing the K0 clutch 6 as needed.

Subsequently, the controller 20 stops the fuel injection of the engine 4 while controlling the motor 5 and the friction brake system 3 to continue the cooperative regenerative braking control.

Subsequently, in Step S23 following Step S22, the controller 20 determines whether the start of the engine 4 is requested during the cooperative regenerative braking control.

Specifically, the controller 20 according to the present embodiment determines that the start of the engine 4 is requested when the steering angle exceeds a predetermined value (α) during the cooperative regenerative braking control or when the A/C switch (air conditioner switch) 71 is turned on during the cooperative regenerative braking control. The former determination is performed on the basis of the signal of the steering angle sensor 52.

Here, when a determination result of Step S23 is Yes, the controller 20 causes the control process to go to Step S24. In this case, the controller 20 causes the control process associated with the motor 5 and the friction brake system 3 to go to Step S45 of FIG. 5 corresponding to Step S24.

In Step S24, the controller 20 performs a restart control under which the engine 4, the motor 5, and the friction brake system 3 work together. The controller 20 returns to the control processes upon completion of this restart control.

On the other hand, when the determination result of Step S23 is No, the controller 20 causes the control process to skip Step S24 and to return. In this case, the controller 20 does not perform the restart control.

On the other hand, in Step S41 corresponding to the control process associated with the motor 5 and the friction brake system 3, the controller 20 determines whether the air conditioner 72 is turned off. This determination is performed on the basis of whether the A/C switch 71 accepts the ON-operation and eventually on the basis of the signal of the A/C switch 71.

When a determination result of Step S41 is Yes, that is, when the air conditioner 72 is turned off (when the air conditioner 72 is not driven), the controller 20 causes the control process to go to Step S42. In this Step S42, the controller 20 releases the K0 clutch 6. The power transmission between the engine 4 and the motor 5 is thereby interrupted. Upon completion of the process related to Step S42, the controller causes the control process to go to Step S43 to initiate the cooperative regenerative braking control.

On the other hand, when the determination result of Step S41 is No, that is, when the air conditioner 72 is turned on (when the A/C switch 71 accepts the ON-operation), the controller 20 skips Step S42 and goes to the control process in Step S43. That is, when the brake pedal 19 is depressed and the A/C switch 71 accepts the ON-operation, the controller 20 initiates the cooperative regenerative braking control without releasing the K0 clutch 6.

In Step S43, the controller 20 performs the cooperative regenerative braking control that the regenerative braking torque of the motor 5 handles a part of the driver's requested braking force. It is noted that the fluid pressure of each friction brake 31 is reduced by as the amount of the regenerative braking torque of the motor 5. The braking force resulting from the friction brake system 3 is reduced by as much as the reduction in the fluid pressure of the friction brakes 31.

Subsequently, in Step S44 following Step S43, the controller 20 determines whether the start of the engine 4 is requested during the cooperative regenerative braking control.

It is noted that the content of Step S44 is identical to that of Step S23 of FIG. 4. For the sake of convenience of description, Step S44 and Step S23 are illustrated in the independent flowcharts. However, the steps are performed not as independent steps but as common processes to the engine 4, the motor 5, and the friction brake system 3.

Here, when a determination result of Step S44 is Yes, the controller 20 causes the control process to go to Step S45 to perform the restart control. The controller 20 causes the control process to return upon completion of this restart control.

On the other hand, when the determination result of Step S44 is No, the controller 20 causes the control process to skip Step S45 and to return. In this case, the controller 20 does not perform the restart control.

(Restart Control)

Figure 6:
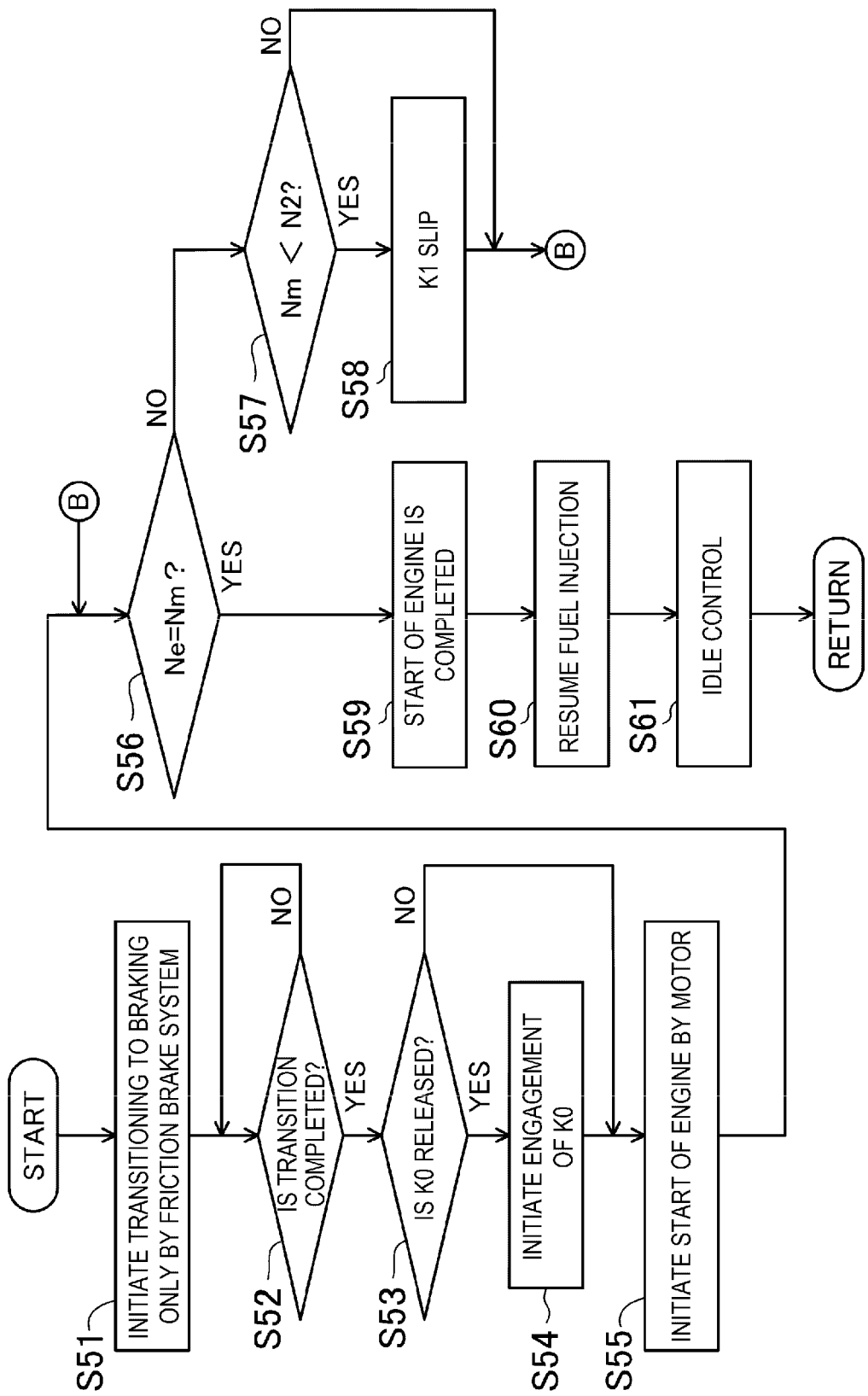
FIG. 6 is a flowchart illustrating processes related to a restart control.

FIG. 6 is a flowchart illustrating processes associated with the restart control. First, in Step S51 of FIG. 6, the controller 20 performs a first process of transitioning from braking by the cooperative regenerative braking control to braking only by the friction brake system 3. The controller 20 switches from the braking by the cooperative regenerative braking control to the braking only by the friction brake 31. When this switching is performed, the requested braking force, including the braking force the regenerative braking torque of the motor 5 handles so far, is made up for entirely by the friction brake system 3.

Specifically, in Step S51, the controller 20 increases the braking force by the friction brakes 31 to make up for the braking force the regenerative braking torque of the motor 5 handles so far. The controller 20 increases the fluid pressure of each friction brake 31 by as the amount of the regenerative braking torque of the motor 5. The braking force resulting from the friction brake system 3 is increased by as much as the increase in the fluid pressure of the friction brakes 31.

However, the fluid pressure of each friction brake 31 is not adjusted momentarily. Therefore, in Step S52 following Step S51, the controller 20 determines whether the transition to the braking only by the friction brake system 3 is completed. This determination is performed on the basis of the signal of the brake fluid pressure sensor 57.

In subsequent Steps S53 to 55, the controller 20 performs, after the completion of the transition to the braking only by the friction brake system 3, a second process of increasing the engine revolution speed by controlling the motor 5 to perform the powering operation or the regenerative operation while initiating the engagement of the K0 clutch 6.

Specifically, in Step S53, the controller 20 determines whether the K0 clutch 6 is released. When a determination result of Step S53 is Yes, the controller 20 causes the control process to go to Step S55 by way of Step S54. On the other hand, when the determination result of Step S53 is No, the controller 20 causes the control process to skip Step S54 and to go to Step S55.

In Step S54, the controller 20 initiates the engagement of the K0 clutch 6 by hydraulically controlling the first hydraulic circuit 13. The K0 clutch 6 is engaged while slipping.

The K0 clutch 6 is gradually engaged via Step S54, or the K0 clutch 6 is already engaged as in the case of skipping Step S54, whereby the motor 5 drives the crankshaft 4a to rotate. At that time, the engine revolution speed may be increased by transmitting the regenerative operation of the motor 5 to the crankshaft 4a or by transmitting the powering operation of the motor 5 to the crankshaft 4a.

It is noted that the engagement with the engine 4 is a rotational resistance for the motor 5. This is why, when the K0 clutch 6 is engaged to initiate the increase of the engine revolution speed, the motor revolution speed and eventually the vehicle velocity are gradually reduced. To address this, an output torque of the motor 5 may be gradually increased by causing the motor 5 to perform the powering operation as the engine revolution speed increases.

As a result, as illustrated in Step S55 following Step S54, start of the engine 4 (an increase in the engine revolution speed) is initiated by transmitting the rotation of the motor 5 to the engine 4. It is noted that in Step S55, the motor 5 is used not for control over the driving force for outputting the travel driving force of the motor vehicle 1 but for the start control of the increase of the engine revolution speed.

Subsequently, the controller 20 performs a third process of controlling the engine 4 to resume operating at the timing after the engine revolution speed increases to match the motor revolution speed after the engagement of the K0 clutch 6 is initiated.

Specifically, in Step S56 following Step S55, the controller 20 determines whether the engine revolution speed has matched the motor revolution speed (Ne=Nm?). This determination is performed on the basis of the signals of the engine revolution sensor 55 and the motor revolution sensor 56.

When a determination result of Step S56 is Yes, the controller 20 causes the control process to go to Step S59. In Step S59, the controller 20 determines that the start of the engine 4 is completed.

On the other hand, when the determination result of Step S56 is No, the controller 20 causes the control process to go to Step S57. In Step S57, the controller 20 determines whether the motor revolution speed is below the predetermined second threshold (N2) (Nm<N2?). This determination is performed on the basis of the signal of the motor revolution sensor 56.

When a determination result of Step S57 is No, the controller 20 causes the control process to skip subsequent Step S58 and to go back to Step S56. That is, the determination of Step S57 is repeatedly performed until the engine revolution speed matches the motor revolution speed.

On the other hand, when the determination result of Step S57 is Yes, the controller 20 causes the control process to go to Step S58. In Step S58, the controller 20 controls the K1 clutch 8d to slip (K1 slip) for interrupting or relaxing the power transmission between the axle and the motor 5.

In this way, the controller 20 is configured to control the K1 clutch 8d to slip when the output revolution speed of the motor 5 decreases to be lower than the second threshold that is the predetermined revolution speed after the engagement of the K0 clutch 6 is initiated in the second process.

In Step S59 following the case where the determination result of Step S56 is Yes, the controller 20 determines that the start of the engine 4 is completed as described above. Therefore, in subsequent Step S60, the controller 20 resumes the fuel injection of the engine 4. The engine 4 thereby resumes operating.

In Step S60, the engine 4 and the motor 5 work together to output the travel driving force of the motor vehicle 1. At that time, the controller 20 controls the engine 4 and the motor 5 so that the deceleration corresponding to the depression amount of the brake pedal 19 can be realized. Nevertheless, the transient or long-term deceleration possibly causes the engine stalling.

To prevent the engine stalling, the controller 20 performs idle control over the motor vehicle 1 in Step S61 following Step S60. Specifically, in this Step S61, the controller 20 determines whether the engine revolution speed and the motor revolution speed are lower than a predetermined idle revolution speed (e.g., the second threshold) (Ne<N2? or Nm<N2?). When a determination result of Step S61 is Yes, the controller 20 controls the K1 clutch 8d to be released or slipped.

Furthermore, the controller 20 adjusts output torques of the engine 4 and the motor 5 in addition to controlling the K1 clutch 8d to be released or slipped, maintaining the engine revolution speed or the motor revolution speed to be equal to or higher than the predetermined revolution speed. At the time, the controller 20 may increase a fuel injection amount of the engine 4. Furthermore, in addition to increasing the fuel injection amount, the controller 20 may assist the idle control by strengthening the powering operation of the motor 5 or weakening the regenerative operation of the motor 5.

In this way, in the third process, when the output revolution speed of the engine 4 matches the output revolution speed of the motor 5 (for example, after the engine 4 resumes operating) and then the output revolution speeds of the engine 4 and the motor 5 decrease below the predetermined idle revolution speed, the controller 20 performs the idle control over the engine 4 so that the output revolution speeds of the engine 4 and the motor 5 increase to be equal to or higher than the idle revolution speed along with the release or the slip of the K1 clutch 8d.

(Control Example)

Next, the first process, the second process, and the third process will be described with reference to the time chart of FIG. 7. This time chart contains a cooperative regeneration flag, a steering angle flag, a restart flag, a situation of operating the accelerator pedal 18, a situation of operating the brake pedal 19, a change in the vehicle velocity, a change in the motor revolution speed, and a change in the engine revolution speed.

Here, the cooperative regeneration flag is set to 1 when it is determined to perform the cooperative regenerative braking control. The steering angle flag is set to 1 when the signal of the steering angle sensor 52 is detected (when the steering wheel 110 is operated). The restart flag is set to 1 when it is determined to perform the restart control. The situation of operating the accelerator pedal 18 is set to ON when the accelerator pedal 18 is operated and to OFF when the accelerator pedal 18 is not operated. The situation of operating the brake pedal 19 is set to ON when the brake pedal 19 is operated and to OFF when the brake pedal 19 is not operated.

First, when the accelerator pedal 18 is not operated (that is, when the motor vehicle 1 decelerates), it is assumed that the brake pedal 19 is depressed at a time t0. In this case, at times before the time t0, the engine 4 is stopped (the fuel injection is stopped) and the engine revolution speed is, therefore, zero.

Furthermore, the vehicle velocity decreases relatively abruptly since the engine 4 is stopped and the brake pedal 19 is depressed. In this case, the cooperative regeneration flag is set to 1 to initiate the cooperative regenerative braking control. The entire requested braking force is realized by cooperation between the motor 5 and the friction brake system 3. At the same time, the motor 5 generates electric power.

Subsequently, it is assumed that the driver operates the steering wheel 110 at a time t1. It is determined from this operation that the restart of the engine 4 was requested. The steering angle flag is set to 1 on the basis of this determination, and the braking by the cooperation between the motor 5 and the friction brake system 3 is switched to the braking only by the friction brake system 3 (first process).

It is assumed that subsequently, the switching of the braking is completed at a time t2. The restart flag is set to 1 in response to the switching completion. When the restart flag is set to 1 to initiate the engagement of the K0 clutch 6, the increase in the engine revolution speed is initiated by receiving the power from the motor 5 (second process). As the engine revolution speed increases, the motor revolution speed continues to decrease.

Subsequently, when the motor revolution speed decreases below the second threshold at a time t3, the K1 clutch 8d is made to slip. Slipping of the K1 clutch 8d causes the motor revolution speed to start increasing to be kept equal to or higher than the second threshold.

Here, as evident from a temporal relationship between the times t2 and t3, the slipping of the K1 clutch 8d is performed after the completion of the switching to the braking only by the friction brake system 3 in the present embodiment.

When the timing of slipping the K1 clutch 8d is not associated with the timing of switching of braking as in the conventionally known configurations, the K1 clutch 8d may be caused to slip while the switching of the braking is not completed yet. In this case, the regenerative operation is performed in a state of inhibiting the power transmission between the motor 5 and the rear wheels 2R. As a result, the output torque (regenerative braking torque) of the motor 5 may be transmitted to the rear wheels 2R insufficiently, and the G-force drop possibly occurs.

On the other hand, according to the present embodiment, the K1 clutch 8d is made to slip after the completion of the switching of braking. The slipping of the K1 clutch 8d is thereby initiated in a state of finishing applying the regenerative braking torque (e.g., in a state of reducing the regenerative braking torque to nearly zero). This can inhibit the occurrence of the G-force drop.

Subsequently, when the engine revolution speed matches the motor revolution speed at a time t4, the controller 20 completes the restart of the engine 4. The controller 20 then resumes the fuel injection of the engine 4, allowing the engine 4 to resume operating (third process).

(Cooperative Relationship Between Switching of Braking and Engine Restart)

As described so far, according to the present embodiment, the motor 5 performs the regenerative operation during the deceleration of the motor vehicle 1 when the friction brake system 3 distributes the braking force to the rear wheels 2R. This control is the cooperative regenerative braking control by the friction brake system 3 and the motor 5. The cooperative regenerative braking control increases the regenerative energy accumulated in the high-voltage battery 9. The regenerative braking torque by the motor 5 is applied to the rear wheels 2R serving as the driving wheels. The friction brake system 3 distributes the braking force to the rear wheels 2R in consideration of the regenerative braking torque applied to the rear wheels 2R. As a result, the braking acting on the motor vehicle 1 is in response to the driver's operating the brake pedal 19. The controller 20 controls the distribution of the braking force so that desired braking (braking in response to the operation of the brake pedal 19) can be realized by the regenerative braking torque and the braking force.

Here, as illustrated in a temporal relationship between Steps S52 and S55 of FIG. 6, when the start of the engine 4 is requested during the cooperative regenerative braking control, the controller 20 increases the output revolution speed of the engine 4 after the completion of the transition from the braking by the cooperative regenerative braking control to the braking only by the friction brake system 3.

Figure 7:
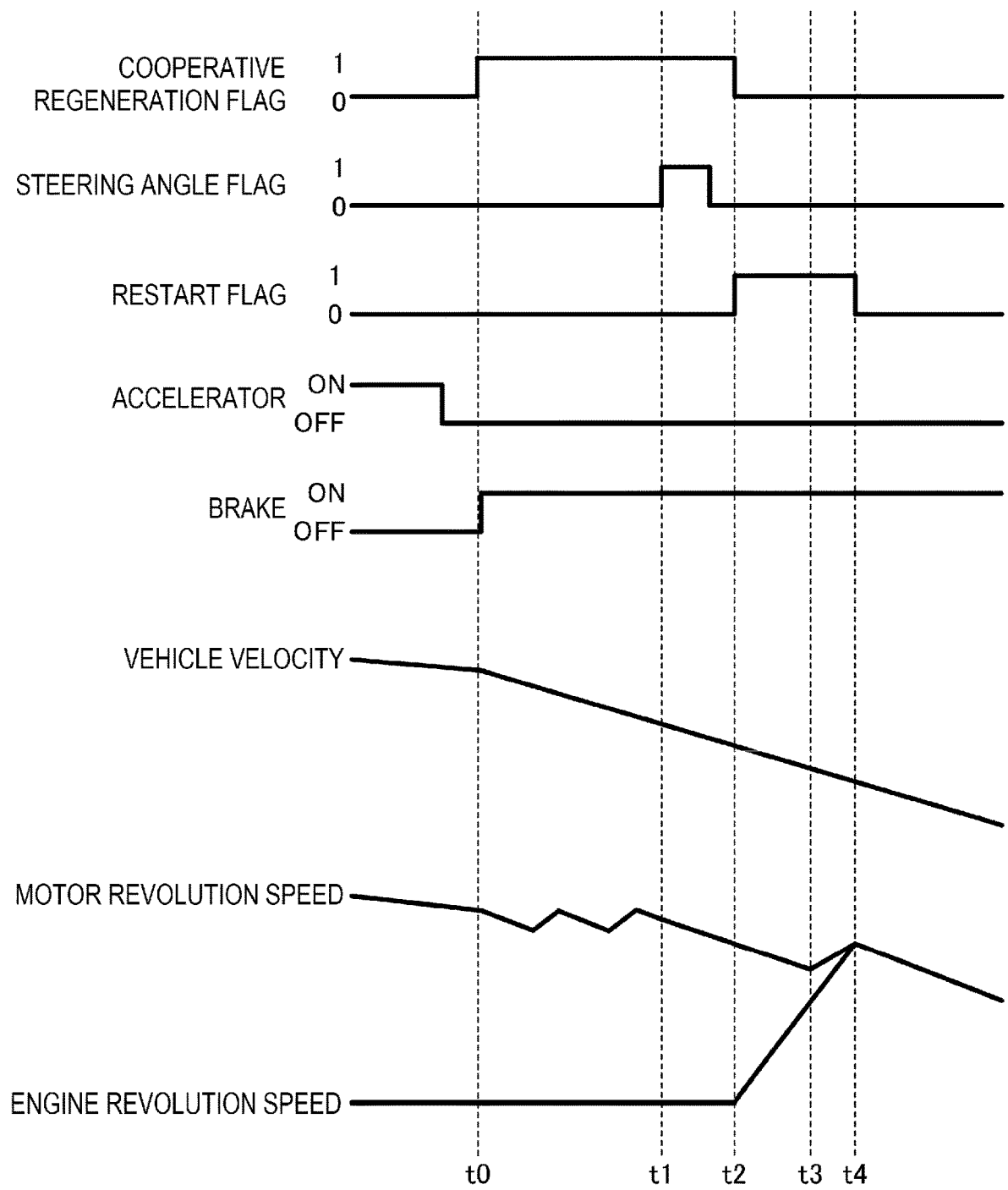
FIG. 7 is a time chart of a first process, a second process, and a third process.

Therefore, as illustrated in the time t2 of FIG. 7, when the adjustment of the engine revolution speed is initiated, the switching of the braking is already completed. As a result, it is possible to inhibit the situation of adjusting the output revolution speeds from affecting the cooperative regenerative braking control and the switching of the braking from the cooperative regenerative braking control.

Furthermore, as illustrated in Step S61 of FIG. 6, the engine revolution speed is, possibly, continuously controlled by the idle control or the like even after being adjusted. Therefore, controlling the start of the engine 4 to be initiated after switching the braking can separate the processes associated with the output revolution speeds such as the idle control from the processes associated with the switching of the braking. The processes such as the idle control can be thereby inhibited from affecting the switching of the braking.

Moreover, as illustrated in Steps S57 and S58 of FIG. 6, the controller 20 controls the K1 clutch 8d to slip when the predetermined condition is satisfied. Making the K1 clutch 8d to slip can reduce the rotational resistance of the motor 5. This can inhibit the reduction in the output revolution speed of the motor 5.

Here, when the timing of slipping the K1 clutch 8d is not associated with the timing of switching to the braking only by the frictional brake system 3 as in conventionally known configurations (e.g., when two processes are initiated simultaneously), the K1 clutch 8d may be slipped while the switching of the braking is not completed yet.

In this case, the regenerative operation is performed in the state of inhibiting the power transmission between the motor 5 and the rear wheels 2R. As a result, the regenerative braking torque applied by the motor 5 may be transmitted to the rear wheels 2R insufficiently, and the G-force drop possibly occurs.

On the other hand, in the present embodiment, the K1 clutch 8d is made to slip after the switching of the braking ends, as illustrated in the temporal relationship between Steps S52 and S58 of FIG. 6 and the temporal relationship between the times t2 and t3 of FIG. 7. The slipping of the K1 clutch 8d is thereby initiated in a state of finishing applying the regenerative braking torque (e.g., in a state of reducing the regenerative braking torque to nearly zero). This can inhibit the occurrence of the G-force drop.

Furthermore, by performing the idle control illustrated in Step S61 of FIG. 6, the output revolution speeds of the engine 4 and the motor 5 can be kept equal to or higher than the idle revolution speed after the engine 4 restarts. This enables smooth acceleration of the motor vehicle 1 when the motor vehicle 1 is requested to accelerate such as when the depression of the brake pedal 19 is transitioned to the depression of the accelerator pedal 18.

Moreover, as illustrated in Step S23 of FIG. 4 and Step S44 of FIG. 5, the controller 20 performs the first process, the second process, and the third process described above when the steering wheel 110 is operated during the deceleration when the brake pedal 19 is depressed (that is, while the cooperative regenerative braking control is being performed). This enables a smooth restart of the engine 4 without causing a problem such as the G-force drop when, for example, the motor vehicle 1 enters a corner with the brake pedal 19 depressed. That can realize a so-called slow-in fast-out cornering technique more smoothly than conventional hybrid vehicles. Operability of the hybrid vehicle can be thereby enhanced.

Moreover, as illustrated in Step S23 of FIG. 4 and Step S44 of FIG. 5, the controller 20 performs the first process, the second process, and the third process described above when the A/C switch 71 is operated during the deceleration when the brake pedal 19 is depressed (that is, while the cooperative regenerative braking control is being performed). This enables the smooth restart of the engine 4 without causing a problem such as the G-force drop when, for example, the air conditioner 72 is desired to be driven during the depression of the brake pedal 19. That can inhibit the occurrence of a shock when the engine restarts. Ride quality of the hybrid vehicle can be thereby enhanced.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Motor vehicle (vehicle, hybrid vehicle)
17 Drive shaft (axle)
19 Brake pedal
20 Controller (control unit)
2R Rear wheel (driving wheel)
3 Friction brake system
4 Engine
5 Motor
6 K0 clutch (first clutch)
8 Automatic transmission
8d K1 clutch (second clutch)
8e Second hydraulic circuit
13 First hydraulic circuit
52 Steering angle sensor
55 Engine revolution sensor
56 Motor revolution sensor
71 A/C switch (air conditioner switch)
72 Air conditioner
110 Steering wheel

The invention claimed is:

1. A control system for a hybrid vehicle comprising an engine that generates a travel driving force of the hybrid vehicle; a motor capable of performing a powering operation and a regenerative operation; a first clutch provided between the engine and the motor and that is switched between an engaged state of mutual engagement between the engine and the motor and a disengaged state of releasing the engagement; and an axle provided between the motor and driving wheels of the hybrid vehicle, the control system comprising:
 a hydraulic friction brake system that distributes a braking force to the driving wheels in response to driver's operating a brake pedal; and
 a control unit capable of performing cooperative regenerative braking control for braking the hybrid vehicle by cooperation between distribution of the braking force by the hydraulic friction brake system and application of a regenerative braking torque to the driving wheels by controlling the motor to perform the regenerative operation in a state of releasing the first clutch during deceleration of the vehicle when operating the brake pedal, wherein
 when start of the engine is requested during the cooperative regenerative braking control, the control unit performs:
  a first process of transitioning braking by the cooperative regenerative braking control to braking only by the hydraulic friction brake system;
  a second process of raising an output revolution speed of the engine by controlling the motor to perform either the powering operation or the regenerative operation while initiating engagement of the first clutch after completion of transitioning to the braking only by the hydraulic friction brake system; and
  a third process of controlling the engine to resume operating at a timing after the output revolution speed of the engine increases to match an output revolution speed of the motor after the engagement of the first clutch is initiated.

2. The control system for the hybrid vehicle according to claim 1, wherein
 the vehicle further comprises a second clutch provided between the motor and the axle and switchable between the engaged state of mutual engagement between the motor and the axle and the disengaged state of releasing the engagement,
 the second clutch is engaged when the cooperative regenerative braking control is performed, and
 the control unit controls the second clutch to slip when the output revolution speed of the motor decreases to be lower than a predetermined revolution speed after the engagement of the first clutch is initiated in the second process.

3. The control system for the hybrid vehicle according to claim 2, wherein
 the control unit controls the second clutch to be released or slipped and controls the engine to increase the output revolution speed of the engine to be equal to or higher than a predetermined idle revolution speed when the output revolution speeds of the engine and the motor decrease below the idle revolution speed after the output revolution speed of the engine is made to match the output revolution speed of the motor in the third process.

4. The control system for the hybrid vehicle according to claim 2, wherein
 the control unit determines that the start of the engine is requested when a steering angle exceeds a predetermined value during the cooperative regenerative braking control.

5. The control system for the hybrid vehicle according to claim 2, wherein
 the control unit determines that the start of the engine is requested when an air conditioner accepts an ON-operation during the cooperative regenerative braking control.

* * * * *